United States Patent
Oh et al.

(10) Patent No.: US 12,475,276 B2
(45) Date of Patent: Nov. 18, 2025

(54) QUANTUM SIMULATION DEVICE AND OPERATING METHOD OF QUANTUM SIMULATION DEVICE

(71) Applicant: Electronics and Telecommunications Research Institute, Daejeon (KR)

(72) Inventors: SooCheol Oh, Daejeon (KR); Chei-Yol Kim, Sejong-si (KR); Jin Ho On, Sejong-si (KR); Gyuil Cha, Daejeon (KR); Hee-Bum Jung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1122 days.

(21) Appl. No.: 17/410,461

(22) Filed: Aug. 24, 2021

(65) Prior Publication Data
US 2022/0164496 A1    May 26, 2022

(30) Foreign Application Priority Data

Nov. 23, 2020   (KR) .................. 10-2020-0158175
Mar. 25, 2021   (KR) .................. 10-2021-0038713

(51) Int. Cl.
  *G06F 7/48*   (2006.01)
  *G06F 17/16*   (2006.01)
  *G06F 30/20*   (2020.01)
  *G06N 10/00*   (2022.01)

(52) U.S. Cl.
  CPC .............. *G06F 30/20* (2020.01); *G06F 17/16* (2013.01); *G06N 10/00* (2019.01)

(58) Field of Classification Search
  CPC .......... G06F 17/16; G06F 30/20; G06N 10/00; G06N 10/70; G06N 10/80
  See application file for complete search history.

(56) References Cited

U.S. PATENT DOCUMENTS

| 8,972,237 | B2 | 3/2015 | Wecker | |
| 9,858,531 | B1* | 1/2018 | Monroe | G06F 15/76 |
| 2018/0225586 | A1* | 8/2018 | Chow | G06N 10/20 |
| 2019/0020345 | A1 | 1/2019 | Kim et al. | |
| 2019/0244128 | A1 | 8/2019 | Choi et al. | |
| 2021/0279627 | A1* | 9/2021 | Bauer | H03M 13/47 |

OTHER PUBLICATIONS

Fowler, Austin et al. "Surface codes: Towards practical large-scale quantum computation", Physical Review A, Sep. 2012, pp. 1-48, vol. 86 (3).

* cited by examiner

*Primary Examiner* — Nithya J. Moll
(74) *Attorney, Agent, or Firm* — KILE PARK REED & HOUTTEMAN PLLC (57) ABSTRACT

Disclosed is an operating method of a surface code-based quantum simulation device including physical qubit storage, which includes storing initialized entanglement states of logical qubits corresponding to different distances, receiving a surface code-based initialization request corresponding to a specific distance, and storing an initialized entanglement state of a logical qubit corresponding to the specific distance from among the initialized entanglement states of the logical qubits corresponding to the different distances in the physical qubit storage.

15 Claims, 6 Drawing Sheets

QUANTUM SIMULATION DEVICE AND OPERATING METHOD OF QUANTUM SIMULATION DEVICE

CROSS-REFERENCE TO RELATED APPLICATIONS

This application claims priority under 35 U.S.C. § 119 to Korean Patent Application Nos. 10-2020-0158175 filed on Nov. 23, 2020 and 10-2021-0038713 filed on Mar. 25, 2021, in the Korean Intellectual Property Office, the disclosures of which are incorporated by reference herein in their entireties.

BACKGROUND

Embodiments of the present disclosure described herein relate to an electronic device, and more particularly, to a quantum simulation device reducing a resource necessary for a quantum simulation and an operating method of the quantum simulation device.

A quantum computer may be a computer that processes data by using quantum mechanical phenomena such as entanglement and superposition. A quantum computer is being considered as a next-generation computer capable of replacing a semiconductor computer. However, technology research associated with the quantum computer has not reached to implement quantum computers.

To study a technology associated with a quantum computer without an implemented quantum computer, a method of simulating a quantum computer with a semiconductor-based computer is being attempted. However, to simulate a quantum computer with a semiconductor-based computer requires enormous resources, and the need for enormous resources is acting as an obstacle to proceed with a more in-depth study on a quantum computer.

SUMMARY

Embodiments of the present disclosure provide a quantum simulation device reducing a resource necessary for a quantum simulation and an operating method of the quantum simulation device.

According to an embodiment, an operating method of a surface code-based quantum simulation device which includes physical qubit storage includes storing initialized entanglement states of logical qubits corresponding to different distances, receiving a surface code-based initialization request corresponding to a specific distance, and storing an initialized entanglement state of a logical qubit corresponding to the specific distance from among the initialized entanglement states of the logical qubits corresponding to the different distances in the physical qubit storage.

As an embodiment, the storing of the initialized entanglement state of the logical qubit corresponding to the specific distance in the physical qubit storage includes storing states indicating the initialized entanglement state of the logical qubit in the physical qubit storage.

As an embodiment, the states are $2^R$, and the "R" corresponds to a value obtained by dividing a value, which is obtained by subtracting 1 from the number of physical qubits indicating the logical qubit, by 4.

As an embodiment, the physical qubits include physical qubits corresponding to X stabilizers, physical qubits corresponding to Z stabilizers, and physical qubits corresponding to data qubits.

As an embodiment, the storing of the initialized entanglement state of the logical qubit corresponding to the specific distance in the physical qubit storage includes storing one state among states indicating the initialized entanglement state of the logical qubit in the physical qubit storage.

As an embodiment, the method further includes measuring a syndrome for a state of a logical qubit stored in the physical qubit storage, and addition of states indicating the state of the logical qubit is prevented in a process of measuring the syndrome.

As an embodiment, the measuring of the syndrome includes determining a product of eigenvalues of neighboring data qubits, for each of 4 neighbor X stabilizers, and determining whether a measurement value of each of the 4 neighbor X stabilizers is |0>, in response to that the product of the eigenvalues of the neighboring data qubits is 1.

As an embodiment, the measuring of the syndrome further includes determining whether the measurement value of each of the 4 neighbor X stabilizers is |1>, in response to that the product of the eigenvalues of the neighboring data qubits is −1.

As an embodiment, the eigenvalues of the neighboring data qubits are measured on a Z-axis basis.

As an embodiment, the measuring of the syndrome further includes determining a product of eigenvalues of neighboring data qubits, for each of 2 neighbor X stabilizers, and determining whether a measurement value of each of the 2 neighbor X stabilizers is |0>, in response to that the product of the eigenvalues of the neighboring data qubits is 1.

As an embodiment, the measuring of the syndrome further includes determining whether the measurement value of each of the 2 neighbor X stabilizers is |1>, in response to that the product of the eigenvalues of the neighboring data qubits is −1.

As an embodiment, the measuring of the syndrome includes determining a product of eigenvalues of neighboring data qubits, for each of 4 neighbor Z stabilizers, and determining whether a measurement value of each of the 4 neighbor Z stabilizers is |0>, in response to that the product of the eigenvalues of the neighboring data qubits is 1.

As an embodiment, the measuring of the syndrome further includes determining whether the measurement value of each of the 4 neighbor Z stabilizers is |1>, in response to that the product of the eigenvalues of the neighboring data qubits is −1.

As an embodiment, the eigenvalues of the neighboring data qubits are measured on an X-axis basis.

As an embodiment, the measuring of the syndrome includes determining a product of eigenvalues of neighboring data qubits, for each of 2 neighbor Z stabilizers, and determining whether a measurement value of each of the 2 neighbor Z stabilizers is |0>, in response to that the product of the eigenvalues of the neighboring data qubits is 1.

As an embodiment, the measuring of the syndrome further includes determining whether the measurement value of each of the 2 neighbor Z stabilizers is |1>, in response to that the product of the eigenvalues of the neighboring data qubits is −1.

According to an embodiment, a quantum simulation device includes physical qubit storage, and a surface code initialization module that stores an initialized entanglement state of a logical qubit in the physical qubit storage. The surface code initialization module includes surface code initialization state tables that store initialized entanglement states of logical qubits corresponding to different distances, and a surface code initialization state injector that stores an initialized entanglement state of a logical qubit corresponding to a specific distance corresponding to an initialization request from among the initialized entanglement states of the logical qubits corresponding to the different distances in the physical qubit storage.

As an embodiment, the quantum simulation device further includes a surface code syndrome measurement module that generates a syndrome for the initialized entanglement state of the logical qubit, without adding states indicating the initialized entanglement state of the logical qubit.

As an embodiment, each of the initialized entanglement states includes at least one of $2^R$ states, and the "R" corresponds to a value obtained by dividing a value, which is obtained by subtracting 1 from the number of physical qubits indicating the logical qubit, by 4.

According to an embodiment, an operating method of a quantum simulation device which simulates a logical qubit including data qubits and stabilizers includes measuring eigenvalues of 4 neighboring data qubits, for each of 4 neighbor stabilizers among the stabilizers, determining a measurement value of each of the 4 neighbor stabilizers depending on a product of the eigenvalues of the 4 neighboring data qubits, measuring eigenvalues of 2 neighboring data qubits, for each of 2 neighbor stabilizers among the stabilizers, and determining a measurement value of each of the 2 neighbor stabilizers depending on a product of the eigenvalues of the 2 neighboring data qubits. The measurement value of each of the 4 neighbor stabilizers and the measurement value of each of the 2 neighbor stabilizers are a syndrome of the logical qubit, and states indicating the logical qubit are prevented from being added during generating the syndrome of the logical qubit.

BRIEF DESCRIPTION OF THE FIGURES

The above and other objects and features of the present disclosure will become apparent by describing in detail embodiments thereof with reference to the accompanying drawings.

DETAILED DESCRIPTION

Below, embodiments of the present disclosure may be described in detail and clearly to such an extent that an ordinary one in the art easily implements the invention.

A quantum computer has an operating characteristic that an error occurs. A surface code may be used to decrease an error occurrence rate of a quantum computer. The surface code combines and uses a plurality of data qubits (e.g., physical qubits used to store data from among physical qubits) and a stabilizer (e.g., physical qubits, which do not store data and are used to decrease an error occurrence rate, from among physical qubits). Accordingly, compared to a quantum computer that does not use a surface code, a quantum computer that uses a surface code requires a more number of physical qubits.

In an embodiment, a memory with a capacity capable of storing $2^n$ states may be required to perform a simulation of a quantum computer using n physical qubits (n being a positive integer). As "n" increases, a memory capacity necessary for the simulation of the quantum computer may exponentially increase. When "n" is greater than or equal to 43, to simulate a quantum computer by using a traditional bit-based computer may be substantially impossible in terms of necessary memory capacity and computation time.

In simulating a quantum system using a quantum surface code with a distance of 3 being the simplest form, a total of 17 physical qubits may be required to represent one logical qubit. When a 2-qubit CNOT operation, one of the most primitive operations, is performed on a logical qubit, a total of 57 physical qubits may be required. The simulation of the CNOT operation requires a memory with a capacity capable of storing $2^{57}$ states, and thus the simulation of the CNOT operation may be substantially impossible.

In the case where the distance increases to 5, 49 physical qubits may be required to represent one logical qubit. A memory with a capacity capable of storing $2^{49}$ states may be required to simulate one logical qubit, and thus, it may be substantially impossible to simulate a single logical qubit.

To solve the above issue, the present invention provides a device or a method capable of substantially implementing a simulation of a quantum entanglement code by reducing the complexity of the quantum entanglement simulation based on a characteristic of the surface code when simulating a surface code-based logic qubit.

Figure 1:
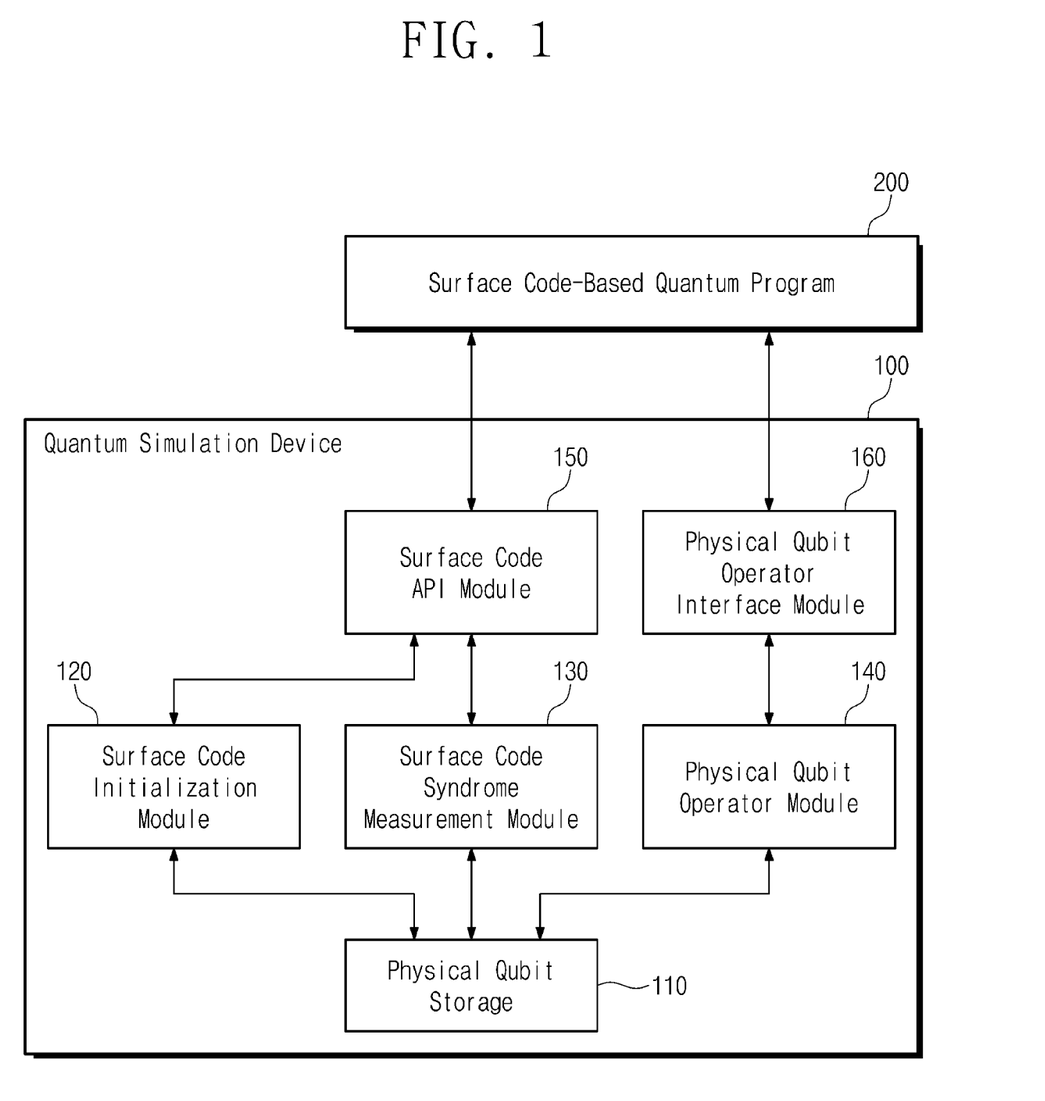
FIG. 1 illustrates an example of a quantum simulation device supporting a surface code, according to an embodiment of the present disclosure.

FIG. 1 illustrates an example of a quantum simulation device 100 supporting a surface code, according to an embodiment of the present disclosure. In an embodiment, the quantum simulation device 100 may include physical qubit storage 110, a surface code initialization module 120, a surface code syndrome measurement module 130, a physical qubit operator module 140, a surface code API module 150, and a physical qubit operator interface module 160. The quantum simulation device 100 may execute a surface code-based quantum program 200 to perform a simulation of a quantum computer.

The physical qubit storage 110 may include a memory that stores physical qubits constituting a surface code-based logical qubit. The surface code initialization module 120 may perform a function of initializing the surface code-based logical qubit. The surface code syndrome measurement module 130 may generate a syndrome for detecting whether an X or Z error occurs at a data qubit constituting a surface code and may measure an error. The physical qubit operator module 140 may apply a quantum operator to each physical qubit of the surface code and may perform a quantum operation.

The surface code API module 150 may provide functions of the surface code initialization module 120 and the surface code syndrome measurement module 130 to the surface code-based quantum program 200 in the form of an application program interface (API). The physical qubit operator interface module 160 may provide a function of the physical qubit operator module 140 to the surface code-based quantum program 200. The surface code-based quantum program 200 may include a user quantum program that is based on the surface code.

The physical qubit storage 110 may store physical qubits of the quantum system that is simulated by the quantum simulation device 100 and executes the surface code-based quantum program 200. For example, the physical qubit storage 110 may be implemented with a main memory of the quantum simulation device 100 or with a portion of the main memory.

Figure 2:
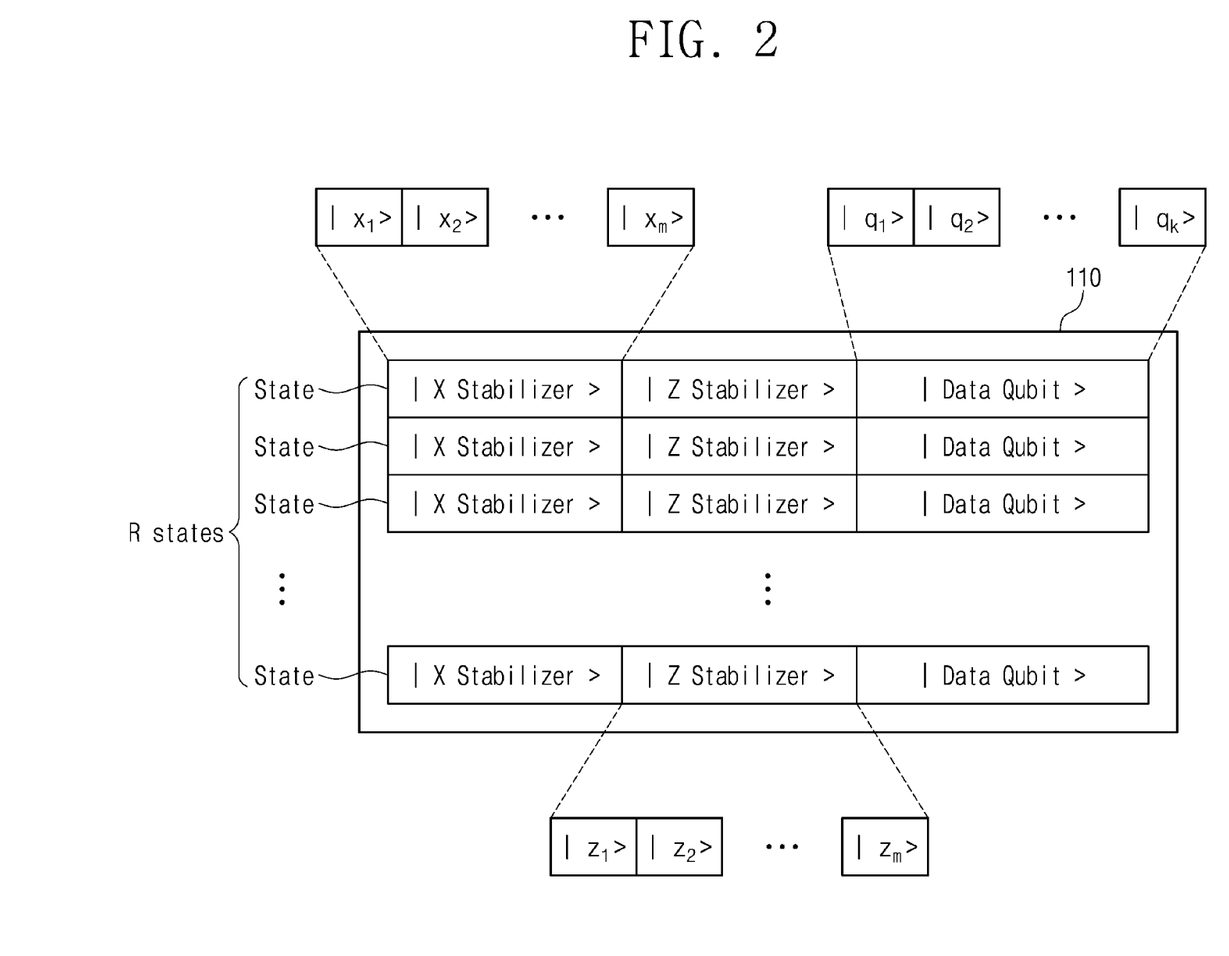
FIG. 2 illustrates a structure diagram of physical qubit storage.

FIG. 2 illustrates a structure diagram of the physical qubit storage 110.

Referring to FIGS. 1 and 2, an entanglement state of a logical qubit implemented based on the surface code may be expressed by "$|\psi\rangle$" and may be stored in the physical qubit storage 110. The physical qubit storage 110 may store the entanglement state $|\psi\rangle$ (e.g., a quantum entanglement state) of the logical qubit in a combination of a plurality of states. The entanglement state $|\psi\rangle$ of the logical qubit may be expressed by Equation 1 below.

$$|\psi\rangle = |x_1 \ldots x_m z_1 \ldots z_m q_1 \ldots q_k\rangle \quad \text{[Equation 1]}$$

In Equation 1, "$x_i$" indicates an X stabilizer. "$Z_i$" indicates a Z stabilizer. "i" may be an integer of 1 or more and "m" or less. "$q_i$" may indicate a data qubit. "j" may be an integer of 1 or more and "k" or less.

In Equation 1, "d" may indicate a distance of the surface code. "k" may indicate the number of data qubits and may correspond to (or equal to) the square (e.g., $d^2$) of the distance "d" of the surface code. "m" may indicate the number of X stabilizers or the number of Z stabilizers and may correspond to Equation 2 below.

$$m = \frac{d^2 - 1}{2} \quad \text{[Equation 2]}$$

"n" may indicate the total number of physical qubits constituting a surface code-based logical qubit and may correspond to Equation 3.

$$n = k + 2m \quad \text{[Equation 3]}$$

The entanglement state $|\psi\rangle$ of each logical qubit stored in the physical qubit storage 110 may be expressed (or defined) by X stabilizers, Z stabilizers, and data qubits. The X stabilizers may include first to m-th X stabilizers $|x_1\rangle$ to $|x_m\rangle$. The Z stabilizers may include first to m-th Z stabilizers $|z_1\rangle$ to $|z_m\rangle$. Data qubits may include first to k-th data qubits $|q_1\rangle$ to $|q_k\rangle$.

An ordinary quantum simulation device expresses an entanglement state of n physical qubits by using $2^n$ states. This means that the ordinary quantum simulation device has to be implemented to have a capacity capable of storing $2^n$ states. In contrast, the quantum simulation device 100 according to an embodiment of the present disclosure may store an entanglement state of n physical qubits by using a capacity corresponding to R states, based on a characteristic of a surface code, and "R" is defined by Equation 4 below.

$$R = 2^{\frac{n-1}{4}} \quad \text{[Equation 4]}$$

As expressed by Equation 4 above, the quantum simulation device 100 according to an embodiment of the present disclosure may reduce a capacity of the physical qubit storage 110 necessary to store states corresponding to an entanglement state of n physical qubits. Accordingly, it may be possible to substantially implement a surface code-based quantum system simulation.

Figure 3:
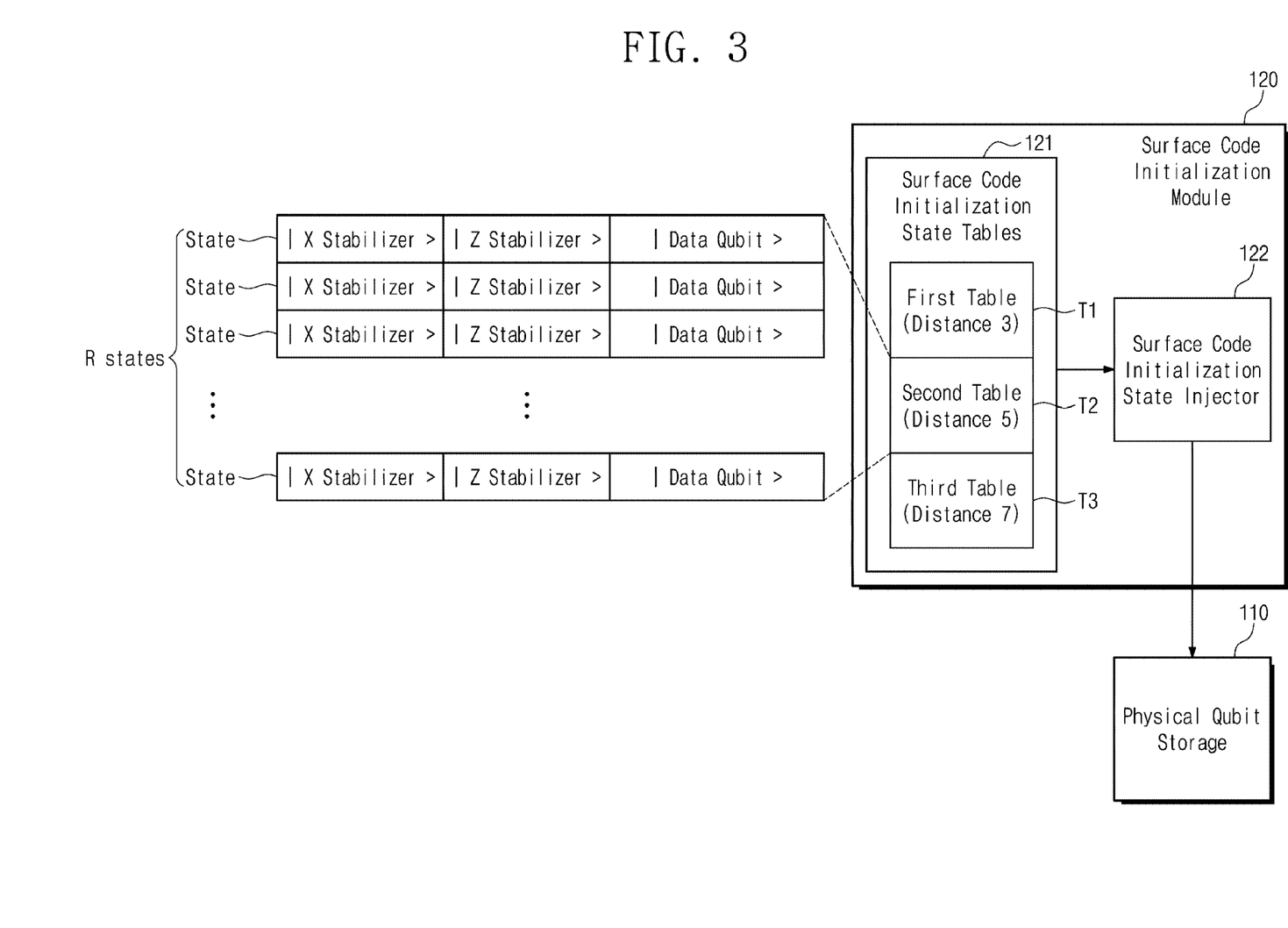
FIG. 3 illustrates an example of a surface code initialization module.

FIG. 3 illustrates an example of the surface code initialization module 120. Referring to FIGS. 1 and 3, the surface code initialization module 120 may include surface code initialization state tables 121, and a surface code initialization state injector 122. The surface code initialization module 120 may perform initialization on a surface code in response to a request transferred from the surface code-based quantum program 200 through the surface code API module 150.

A surface code having a given distance "d" may include n physical qubits. In terms of the quantum entanglement, in the case where the initialization of the surface code is made, an entanglement state $|\psi\rangle$ of a logical qubit is entangled with $R^2$ states from one quantum state at the beginning. Afterwards, a portion of the entanglement state may be broken through stabilizer measurement and error correction, and the entanglement state $|\psi\rangle$ of the logical qubit may be finally in a state where R states are entangled. In the case where the entanglement state $|\psi\rangle$ of the logical qubit is expressed by the entanglement of R states, the initialization of the surface code may be completed.

Whenever the initialization of the surface code is performed, an entanglement state in which the initialization of the surface code is completed may be identical. Accordingly, the entanglement state $|\psi\rangle$ of each of logical qubits in which initialization according to a distance is completed may be in advance generated and may be stored in the surface code initialization state tables 121. In an embodiment, the surface code initialization state tables 121 may include a first table T1 corresponding to an entanglement state $|\psi\rangle$ in which there is initialized a logical qubit when a distance "d" is 3, a second table T2 corresponding to an entanglement state $|\psi\rangle$ in which there is initialized a logical qubit when a distance "d" is 5, and a third table T3 corresponding to an entanglement state $|\psi\rangle$ in which there is initialized a logical qubit when a distance "d" is 7. However, a distance corresponding to a logical qubit included in surface code initialization state tables is not limited.

The first to third tables T1 to T3 of the surface code initialization state tables 121 may store an entanglement state $|\psi\rangle$ of a logical qubit in which R states of X stabilizers, Z stabilizers, and data qubit are entangled.

First Embodiment of Initialization Method

In response to that initialization of a surface code having a specific distance "d" is called by a surface code-based quantum program through a surface code API module, the surface code initialization state injector 122 may read an initialized entanglement state $|\psi\rangle$ of a logical qubit stored in a table corresponding to the distance "d" from among the surface code initialization state tables 121 and may store the read initialized entanglement state $|\psi\rangle$ in the physical qubit storage 110.

For example, in the case where the distance "d" is 7, a total of 97 physical qubits may be required. As an ordinary quantum simulation device requires physical qubit storage of a capacity capable of storing $2^{97}$ states and operations according to the states, it may be impossible to substantially implement the quantum simulation device. The quantum simulation device 100 according to an embodiment of the present disclosure may require only a capacity capable of storing Re1 with respect to the physical qubit storage 110, and Re1 is defined by Equation 5 below.

$$Re1 = 2^{\frac{97-1}{4}} = 2^{24} \quad \text{[Equation 5]}$$

As expressed by Equation 5 above, the quantum simulation device 100 according to an embodiment of the present disclosure requires the physical qubit storage 110 of a capacity capable of being practically implemented and operations according to the capacity. Accordingly, a simulation of a surface code-based quantum system may be implemented.

Second Embodiment of Initialization Method

When a logical qubit is initialized, an entanglement state $|\psi\rangle$ of the logical qubit is expressed by R states (e.g., by entanglement of R states). After the initialization of the logical qubit, when various operations are applied to the logical qubit and the logical qubit is finally measured, each of the R states may have the same eigenvalue. Accordingly, the same phenomenon and/or advantages as the first embodiment of the initialization method may be obtained by storing only any one state of the R states as the initialized entanglement state $|\psi\rangle$ of the logical qubit.

When an error occurs at a data qubit of a surface code, the surface code syndrome measurement module 130 may detect the occurrence of the error through syndrome measurement. A Z error occurring at a data qubit may be detected by using an X stabilizer, and an X error may be detected by using a Z stabilizer. As in the initialization process, even in the measurement process, a surface code syndrome may have an entanglement state that is expressed by a maximum of $R^2$ states. Accordingly, memory costs of the physical qubit storage 110 and calculation costs may increase even in a simulation in which a syndrome is measured.

Figure 4:
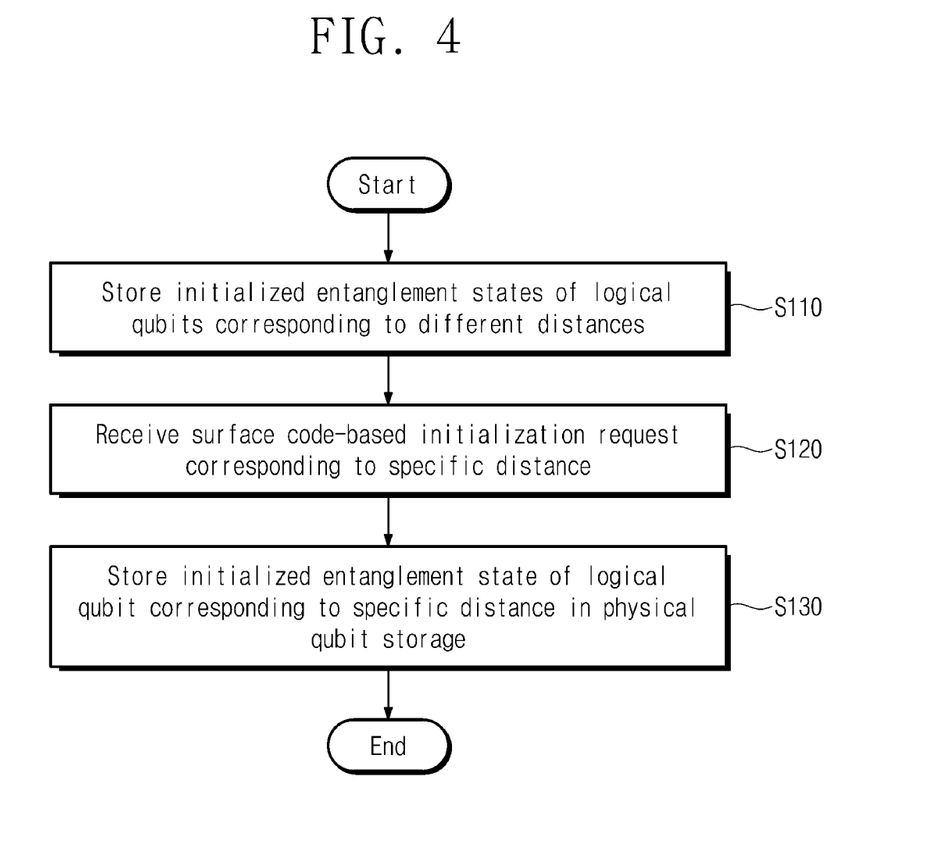
FIG. 4 illustrates an operating method of a quantum simulation device according to an embodiment of the present disclosure.

FIG. 4 illustrates an operating method of the quantum simulation device 100 according to an embodiment of the present disclosure. Referring to FIG. 4, in operation S110, the quantum simulation device 100 may store states indicating initialized entanglement states of logical qubits corresponding to different distances in the surface code initialization state tables 121 of the surface code initialization module 120.

In operation S120, the quantum simulation device 100 may receive a surface code-based initialization request corresponding to a specific distance from the surface code-based quantum program 200 through the surface code API module 150.

In operation S130, the quantum simulation device 100 may complete the initialization by storing states indicating an initialized entanglement state of a logical qubit corresponding to the specific distance in the physical qubit storage 110. An initialization time may decrease by storing an initialized entanglement state of a logical qubit, which is stored in advance, in the physical qubit storage 110. Also, a capacity necessary to store the initialized entanglement state of the logical qubit may decrease.

The quantum simulation device 100 according to an embodiment of the present disclosure may generate a syndrome measurement result at X stabilizers and Z stabilizers without adding states indicating an entanglement state in a syndrome measurement process.

The process of generating a syndrome measurement result with respect to the X stabilizers is expressed by Equation 6 below.

$$|x_1 x_2 \ldots x_m\rangle = F_x(|q_1 q_2 \ldots q_k\rangle) \quad \text{[Equation 6]}$$

The process of generating a syndrome measurement result with respect to the Z stabilizers is expressed by Equation 7 below.

$$|z_1 z_2 \ldots z_m\rangle = F_z(|q_1 q_2 \ldots q_k\rangle) \quad \text{[Equation 7]}$$

Figure 5:
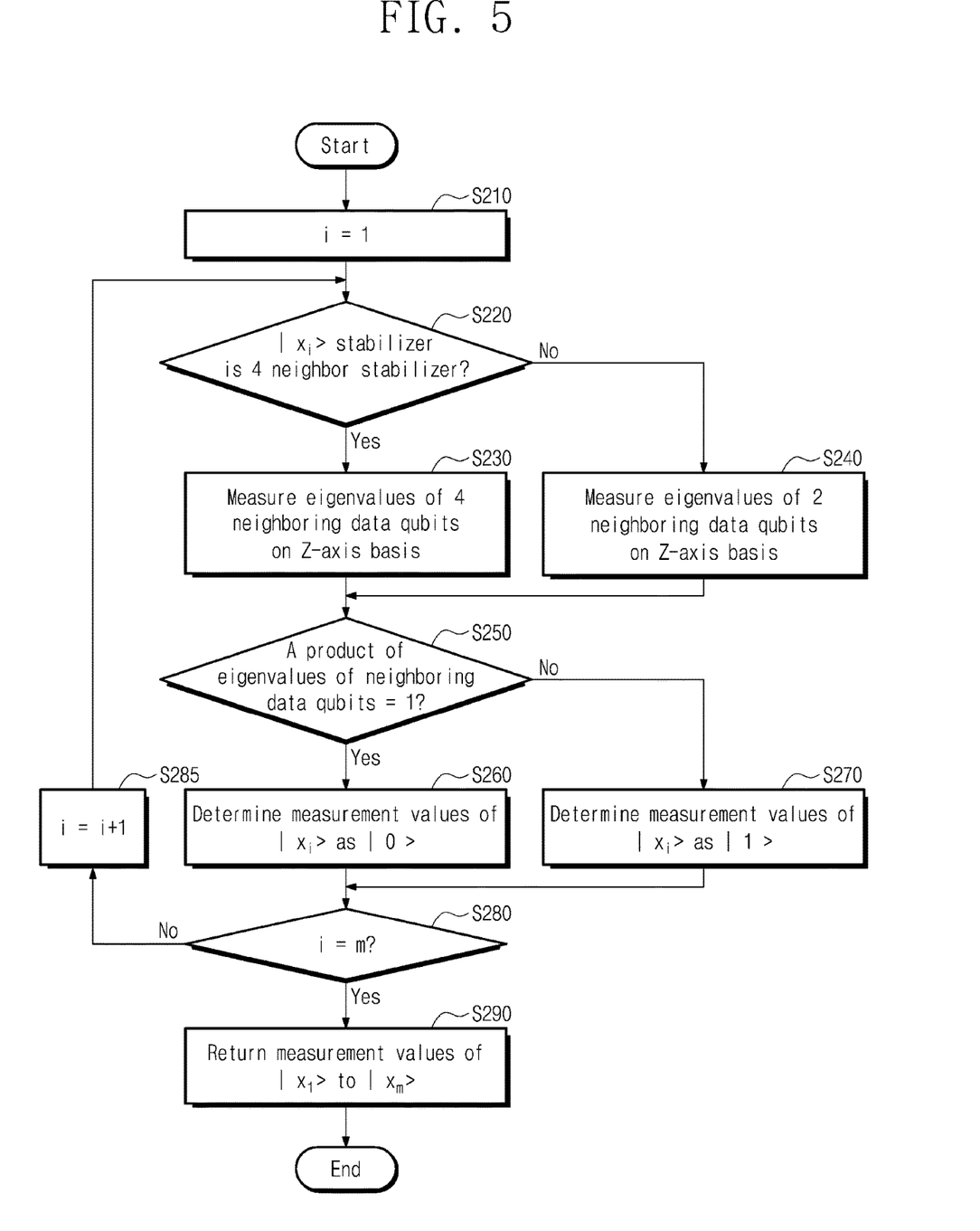
FIG. 5 illustrates an example of syndrome generation associated with X stabilizers.

FIG. 5 illustrates a method of syndrome generation Fx associated with X stabilizers. Referring to FIG. 5, the syndrome generation Fx associated with X stabilizers may perform the same process on all the first to m-th X stabilizers $|x_1\rangle$ to $|x_m\rangle$ constituting the X stabilizers. An arbitrary i-th X stabilizer $|x_i\rangle$ may be either a 4 neighbor stabilizer or a 2 neighbor stabilizer. When any X stabilizer $|x_i\rangle$ is a 4 neighbor stabilizer, eigenvalues of 4 neighboring data qubits may be measured on a Z-axis basis. When any X stabilizer $|x_i\rangle$ is a 2 neighbor stabilizer, eigenvalues of 2 neighboring data qubits may be measured on a Z-axis basis.

A quantum simulation of the quantum simulation device 100 may measure states of data qubits without causing the collapse of data qubits. A product of eigenvalues of neighboring data qubits may be 1 or −1. When a product of eigenvalues of neighboring data qubits is 1, a measurement value of the X stabilizer $|x_i\rangle$ may be $|0\rangle$. When a product of eigenvalues of neighboring data qubits is −1, a measurement value of the X stabilizer $|x_i\rangle$ may be $|1\rangle$.

In more detail, in operation S210, the surface code syndrome measurement module 130 may initialize a variable "i" (e.g., to 1). In operation S220, the surface code syndrome measurement module 130 may determine whether an i-th X stabilizer $|x_i\rangle$ is a 4 neighbor stabilizer.

When the i-th X stabilizer $|x_i\rangle$ is a 4 neighbor stabilizer, in operation S230, the surface code syndrome measurement module 130 may measure eigenvalues of 4 neighboring data qubits on a Z-axis basis. Afterwards, the surface code syndrome measurement module 130 may perform operation S250.

When the i-th X stabilizer $|x_i\rangle$ is not the 4 neighbor stabilizer, the surface code syndrome measurement module 130 may determine the i-th X stabilizer $|x_i\rangle$ as a 2 neighbor stabilizer. In operation S240, the surface code syndrome measurement module 130 may measure eigenvalues of 2 neighboring data qubits on a Z-axis basis. Afterwards, the surface code syndrome measurement module 130 may perform operation S250.

In operation S250, the surface code syndrome measurement module 130 may determine whether a product of eigenvalues of neighboring data qubits is 1. When the product of the eigenvalues of the neighboring data qubits is 1, in operation S260, the surface code syndrome measurement module 130 may determine a measurement value of the i-th X stabilizer $|x_i\rangle$ as $|0\rangle$. Afterwards, the surface code syndrome measurement module 130 may perform operation S280.

When the product of the eigenvalues of the neighboring data qubits is not 1, in operation S270, the surface code syndrome measurement module 130 may determine a measurement value of the i-th X stabilizer $|x_i\rangle$ as $|1\rangle$. Afterwards, the surface code syndrome measurement module 130 may perform operation S280.

In operation S280, the surface code syndrome measurement module 130 may determine whether the variable "i" reaches "m", that is, whether all the X stabilizers are completely measured. When the variable "i" does not reach "m", in operation S285, the surface code syndrome measurement module 130 may increase the variable "i" as much as 1. Afterwards, the surface code syndrome measurement module 130 may again perform operation S220 to operation S280.

When the variable "i" reaches "m", the surface code syndrome measurement module 130 may perform operation S290. In operation S290, the surface code syndrome measurement module 130 may return the measurement values of the first to m-th X stabilizers $|x_1\rangle$ to $|x_m\rangle$.

Figure 6:
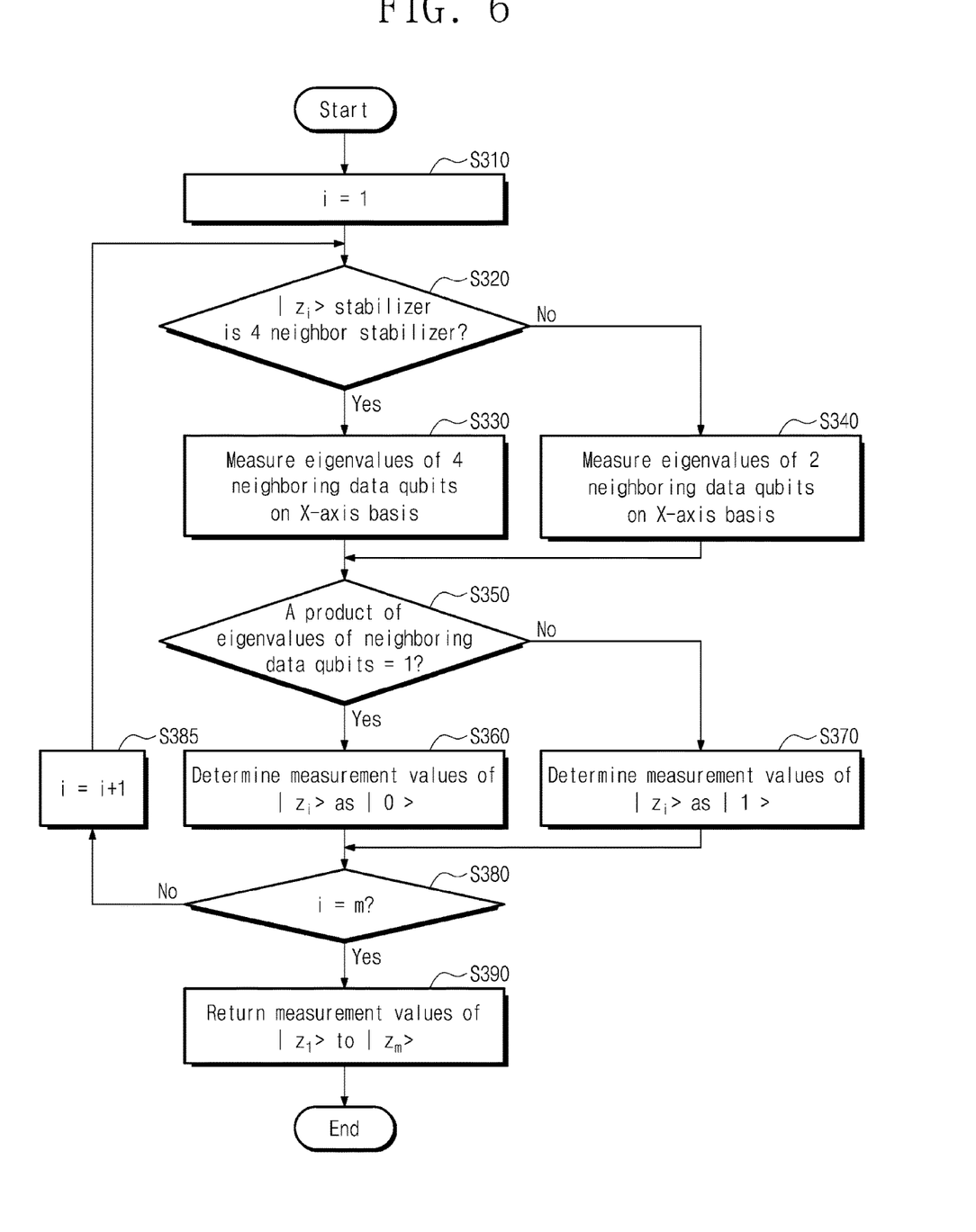
FIG. 6 illustrates an example of syndrome generation associated with Z stabilizers.

FIG. 6 illustrates a method of syndrome generation Fz associated with Z stabilizers. Referring to FIG. 6, the syndrome generation Fz associated with Z stabilizers may perform the same process on all the first to m-th Z stabilizers $|z_1\rangle$ to $|z_m\rangle$ constituting the Z stabilizers. An arbitrary i-th Z stabilizer $|z_i\rangle$ may be either a 4 neighbor stabilizer or a 2 neighbor stabilizer. When any Z stabilizer $|z_i\rangle$ is a 4 neighbor stabilizer, eigenvalues of 4 neighboring data qubits may be measured on an X-axis basis. When any Z stabilizer $|z_i\rangle$ is a 2 neighbor stabilizer, eigenvalues of 2 neighboring data qubits may be measured on an X-axis basis.

A quantum simulation of the quantum simulation device 100 may measure states of data qubits without causing the collapse of data qubits. A product of eigenvalues of neighboring data qubits may be 1 or −1. When a product of eigenvalues of neighboring data qubits is 1, a measurement value of the Z stabilizer $|z_i\rangle$ may be $|0\rangle$. When a product of eigenvalues of neighboring data qubits is −1, a measurement value of the Z stabilizer $|z_i\rangle$ may be $|1\rangle$.

In more detail, in operation S310, the surface code syndrome measurement module 130 may initialize a variable "i" (e.g., to 1). In operation S320, the surface code syndrome measurement module 130 may determine whether an i-th Z stabilizer $|z_i\rangle$ is a 4 neighbor stabilizer.

When the i-th Z stabilizer $|z_1\rangle$ is a 4 neighbor stabilizer, in operation S330, the surface code syndrome measurement module 130 may measure eigenvalues of 4 neighboring data qubits on an X-axis basis. Afterwards, the surface code syndrome measurement module 130 may perform operation S350.

When the i-th Z stabilizer $|z_1\rangle$ is not the 4 neighbor stabilizer, the surface code syndrome measurement module 130 may determine the i-th Z stabilizer $|z_i\rangle$ as a 2 neighbor stabilizer. In operation S340, the surface code syndrome measurement module 130 may measure eigenvalues of 2 neighboring data qubits on an X-axis basis. Afterwards, the surface code syndrome measurement module 130 may perform operation S350.

In operation S350, the surface code syndrome measurement module 130 may determine whether a product of eigenvalues of neighboring data qubits is 1. When the product of the eigenvalues of the neighboring data qubits is 1, in operation S360, the surface code syndrome measurement module 130 may determine a measurement value of the i-th Z stabilizer $|z_1\rangle$ as $|0\rangle$. Afterwards, the surface code syndrome measurement module 130 may perform operation S380.

When the product of the eigenvalues of the neighboring data qubits is not 1, in operation S370, the surface code syndrome measurement module 130 may determine a measurement value of the i-th Z stabilizer $|z_i\rangle$ as $|1\rangle$. Afterwards, the surface code syndrome measurement module 130 may perform operation S380.

In operation S380, the surface code syndrome measurement module 130 may determine whether the variable "i" reaches "m", that is, whether all the Z stabilizers are completely measured. When the variable "i" does not reach "m", in operation S385, the surface code syndrome measurement module 130 may increase the variable "i" as much as 1. Afterwards, the surface code syndrome measurement module 130 may again perform operation S320 to operation S380.

When the variable "i" reaches "m", the surface code syndrome measurement module 130 may perform operation S390. In operation S390, the surface code syndrome measurement module 130 may return the measurement values of the first to m-th Z stabilizers $|z_1\rangle$ to $|z_m\rangle$.

The surface code API module 150 may provide functions of the surface code initialization module 120 and the surface code syndrome measurement module 130 to the surface code-based quantum program 200 in the form of an API. The API that the surface code API module 150 provides is as follows.

First Embodiment of Surface Code API

The name of the first embodiment of the surface code API may be "create_surface_code". An operation of the first embodiment of the surface code API may include allocating physical qubits for a logical qubit, and calling the surface code initialization module 120 to perform initialization of the surface code. An argument of the first embodiment of the surface code API may include a distance of the surface code, a list of physical qubits used as data qubits, a list of physical qubits used as X stabilizers, a list of physical qubits used as Z stabilizers, a list of neighbor data qubits of the X stabilizers, and a list of neighbor data qubits of the Z stabilizers. A return value of the first embodiment of the surface code API may include a number of a logical qubit generated with the surface code.

Second Embodiment of Surface Code API

A name of the second embodiment of the surface code API may be "measure_syndrome". An operation of the second embodiment of the surface code API may include performing an operation of the surface code syndrome measurement module 130. An argument of the second embodiment of the surface code API may include a logical qubit number and a return value. The return value of the second embodiment of the surface code API may include syndrome measurement values of X stabilizers and syndrome measurement values of Z stabilizers.

The physical qubit operator module 140 may simulate a quantum operator targeting physical qubits. The physical qubit operator interface module 160 may provide a function of the physical qubit operator module 140 to the surface code-based quantum program 200. The surface code-based quantum program 200 may be a quantum program generated based on the surface code API module 150 and the physical qubit operator interface module 160.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above-described embodiments, components according to embodiments of the present disclosure are referred to by using the term "blocks" or "modules". The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to the present disclosure, a capacity of an initialized entanglement state of a logical qubit decreases. Also, the number of states indicating an entanglement state is prevented from being added in the process of calculating a syndrome of a logical qubit. Accordingly, a quantum simulation device reducing a resource necessary for a quantum simulation and an operating method of the quantum simulation device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operating method of a surface code-based quantum simulation device that includes physical qubit storage, the method comprising:
    storing initialized entanglement states of logical qubits corresponding to different distances;
    receiving a surface code-based initialization request corresponding to a specific distance; and
    storing an initialized entanglement state of a logical qubit corresponding to the specific distance from among the initialized entanglement states of the logical qubits corresponding to the different distances in the physical qubit storage,
    wherein the storing of the initialized entanglement state of the logical qubit corresponding to the specific distance in the physical qubit storage includes:
        storing states indicating the initialized entanglement state of the logical qubit in the physical qubit storage,
    wherein the states are $2^R$, and
    wherein the "R" corresponds to a value obtained by dividing a value, which is obtained by subtracting 1 from the number of physical qubits indicating the logical qubit, by 4.

2. The method of claim 1, wherein the physical qubits include physical qubits corresponding to X stabilizers, physical qubits corresponding to Z stabilizers, and physical qubits corresponding to data qubits.

3. The method of claim 1, wherein the storing of the initialized entanglement state of the logical qubit corresponding to the specific distance in the physical qubit storage includes:
    storing one state among states indicating the initialized entanglement state of the logical qubit in the physical qubit storage.

4. The method of claim 1, further comprising:
    measuring a syndrome for a state of a logical qubit stored in the physical qubit storage,
    wherein addition of states indicating the state of the logical qubit is prevented in a process of measuring the syndrome.

5. The method of claim 4, wherein the measuring of the syndrome includes:
    determining a product of eigenvalues of neighboring data qubits, for each of 4 neighbor X stabilizers; and
    determining whether a measurement value of each of the 4 neighbor X stabilizers is |0>, in response to that the product of the eigenvalues of the neighboring data qubits is 1.

6. The method of claim 5, wherein the measuring of the syndrome further includes:
    determining whether the measurement value of each of the 4 neighbor X stabilizers is |1>, in response to that the product of the eigenvalues of the neighboring data qubits is −1.

7. The method of claim 5, wherein the eigenvalues of the neighboring data qubits are measured on a Z-axis basis.

8. The method of claim 4, wherein the measuring of the syndrome further includes:
    determining a product of eigenvalues of neighboring data qubits, for each of 2 neighbor X stabilizers; and
    determining whether a measurement value of each of the 2 neighbor X stabilizers is |0>, in response to that the product of the eigenvalues of the neighboring data qubits is 1.

9. The method of claim 8, wherein the measuring of the syndrome further includes:
    determining whether the measurement value of each of the 2 neighbor X stabilizers is |1>, in response to that the product of the eigenvalues of the neighboring data qubits is −1.

10. The method of claim 4, wherein the measuring of the syndrome includes:
    determining a product of eigenvalues of neighboring data qubits, for each of 4 neighbor Z stabilizers; and
    determining whether a measurement value of each of the 4 neighbor Z stabilizers is |0>, in response to that the product of the eigenvalues of the neighboring data qubits is 1.

11. The method of claim 10, wherein the measuring of the syndrome further includes:
    determining whether the measurement value of each of the 4 neighbor Z stabilizers is |1>, in response to that the product of the eigenvalues of the neighboring data qubits is −1.

12. The method of claim 10, wherein the eigenvalues of the neighboring data qubits are measured on an X-axis basis.

13. The method of claim 4, wherein the measuring of the syndrome includes:
    determining a product of eigenvalues of neighboring data qubits, for each of 2 neighbor Z stabilizers; and
    determining whether a measurement value of each of the 2 neighbor Z stabilizers is |0>, in response to that the product of the eigenvalues of the neighboring data qubits is 1.

14. The method of claim 13, wherein the measuring of the syndrome further includes:
    determining whether the measurement value of each of the 2 neighbor Z stabilizers is |1>, in response to that the product of the eigenvalues of the neighboring data qubits is −1.

15. An operating method of a quantum simulation device which simulates a logical qubit including data qubits and stabilizers, the method comprising:
    measuring, by the quantum simulation device, eigenvalues of 4 neighboring data qubits, for each of 4 neighbor stabilizers among the stabilizers;
    determining, by the quantum simulation device, a measurement value of each of the 4 neighbor stabilizers depending on a product of the eigenvalues of the 4 neighboring data qubits;
    measuring, by the quantum simulation device, eigenvalues of 2 neighboring data qubits, for each of 2 neighbor stabilizers among the stabilizers; and
    determining, by the quantum simulation device, a measurement value of each of the 2 neighbor stabilizers depending on a product of the eigenvalues of the 2 neighboring data qubits,
    wherein the measurement value of each of the 4 neighbor stabilizers and the measurement value of each of the 2 neighbor stabilizers are a syndrome of the logical qubit, and wherein states indicating the logical qubit are prevented from being added during generating the syndrome of the logical qubit, and wherein the operating method further comprises:
  determining the product of the eigenvalues of the 4 neighboring data qubits; and
  determining whether the measurement value of each of the 4 neighbor stabilizers is |0>, in response to that the product of the eigenvalues of the 4 neighboring data qubits is 1.

\* \* \* \* \*